United States Patent [19]

Benyassine et al.

[11] Patent Number: 5,774,849
[45] Date of Patent: Jun. 30, 1998

[54] METHOD AND APPARATUS FOR GENERATING FRAME VOICING DECISIONS OF AN INCOMING SPEECH SIGNAL

[75] Inventors: Adil Benyassine, Costa Mesa; Eyal Shlomot, Irvine, both of Calif.

[73] Assignee: Rockwell International Corporation, Newport Beach, Calif.

[21] Appl. No.: 589,509

[22] Filed: Jan. 22, 1996

[51] Int. Cl.[6] .................................................... G10L 5/06
[52] U.S. Cl. ......................... 704/246; 704/214; 704/227
[58] Field of Search ................................. 395/2.22–2.25, 395/2.28, 2.35–2.37, 2.42, 2.55, 2.6; 704/213–216, 219, 226–228, 233, 246, 251

[56] References Cited

U.S. PATENT DOCUMENTS

| | | | |
|---|---|---|---|
| 4,672,669 | 6/1987 | DesBlacke et al. | 395/2.46 |
| 4,975,956 | 12/1990 | Liu et al. | 395/2.28 |
| 5,255,339 | 10/1993 | Fette et al. | 395/2.09 |
| 5,276,765 | 1/1994 | Freeman et al. | 395/2.42 |
| 5,278,944 | 1/1994 | Sasaki et al. | 395/2.21 |
| 5,475,712 | 12/1995 | Sasaki | 395/2.28 |
| 5,509,102 | 4/1996 | Sasaki | 395/2.28 |
| 5,596,680 | 1/1997 | Chow et al. | 395/2.59 |

*Primary Examiner*—Kee M. Tung
*Attorney, Agent, or Firm*—William C. Cray; Philip K. Yu

[57] ABSTRACT

A method is disclosed for generating frame voicing decisions for an incoming speech signal having periods of active voice and non-active voice for a speech encoder in a speech communication system. The method first extracts a predetermined set of parameters from the incoming speech signal for each frame and then makes a frame voicing decision of the incoming speech signal for each frame according to a set of difference measures extracted from the predetermined set of parameters. The predetermined set of extracted parameters comprises a description of the spectrum of the incoming speech signal based on line spectral frequencies ("LSF"). Additional parameters may include full band energy, low band energy and zero crossing rate. The way to make a frame voicing decision of the incoming speech signal for each frame according to the set of difference measures is by finding a union of sub-spaces with each sub-space being described by a linear function of at least a pair of parameters from the predetermined set of parameters.

14 Claims, 2 Drawing Sheets

VAD Operation Flowchart

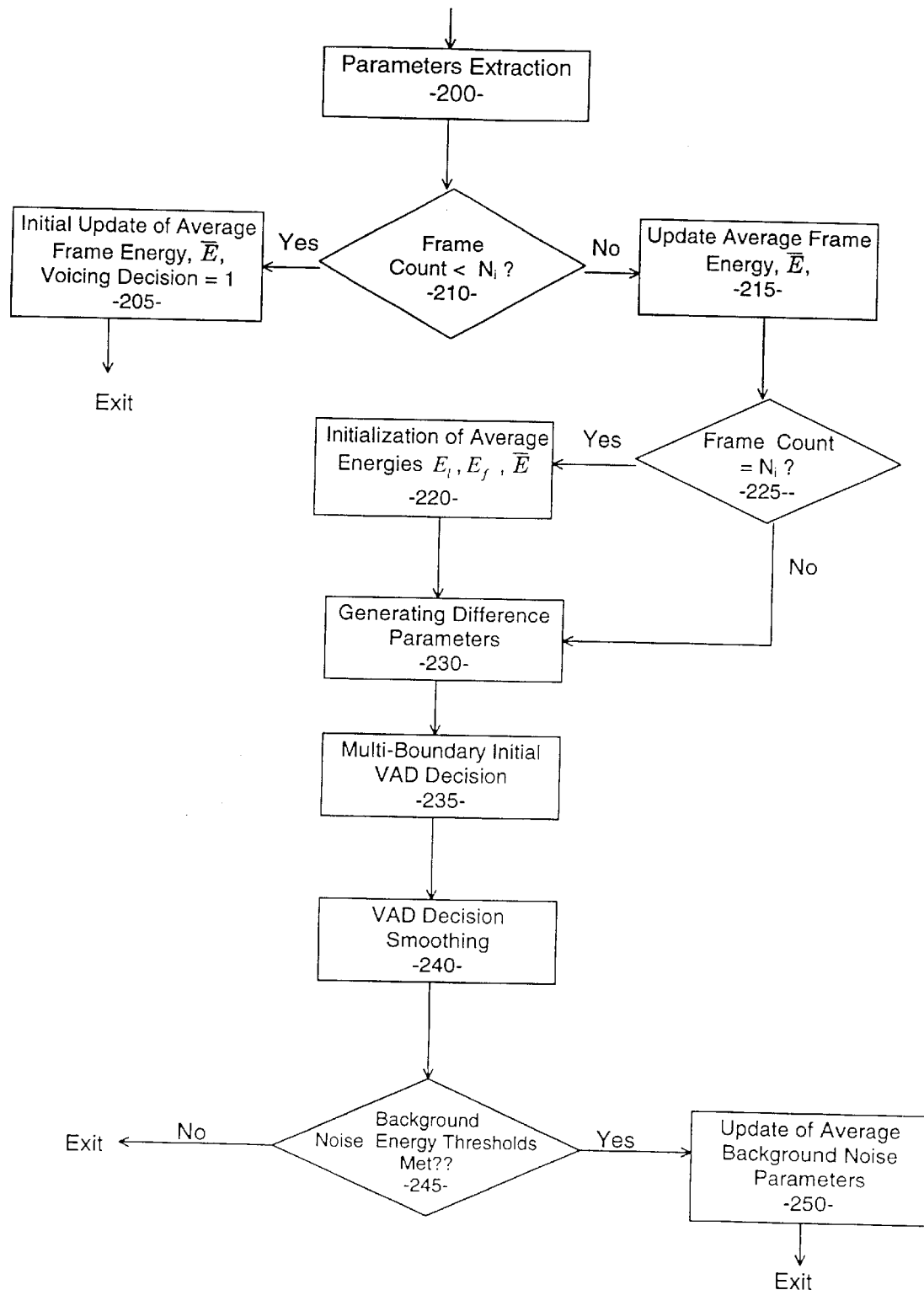
*Figure 2* - VAD Operation Flowchart

METHOD AND APPARATUS FOR
GENERATING FRAME VOICING
DECISIONS OF AN INCOMING SPEECH
SIGNAL

RELATED APPLICATION

The present invention is related to another pending Patent Application, entitled USAGE OF VOICE ACTIVITY DETECTION FOR EFFICIENT CODING OF SPEECH, filed on the same date, with Ser. No. 589,321, and also assigned to the present assignee. The disclosure of the Related Application is incorporated herein by reference.

1. Field of Invention

The present invention relates to speech coding in communication systems and more particularly to dual-mode speech coding schemes.

2. Art Background

Modern communication systems rely heavily on digital speech processing in general and digital speech compression in particular. Examples of such communication systems are digital telephony trunks, voice mail, voice annotation, answering machines, digital voice over data links, etc.

A speech communication system is typically comprised of an encoder, a communication channel and a decoder. At one end, the speech encoder converts a speech which has been digitized into a bit-stream. The bit-stream is transmitted over the communication channel (which can be a storage medium), and is converted again into a digitized speech by the decoder at the other end.

The ratio between the number of bits needed for the representation of the digitized speech and the number of bits in the bit-stream is the compression ratio. A compression ratio of 12 to 16 is achievable while keeping a high quality of reconstructed speech.

A considerable portion of the normal speech is comprised of silence, up to an average of 60% during a two-way conversation. During silence, the speech input device, such as a microphone, picks up the environment noise. The noise level and characteristics can vary considerably, from a quiet room to a noisy street or a fast moving car. However, most of the noise sources carry less information than the speech and hence a higher compression ratio is achievable during the silence periods.

In the following description, speech will be denoted as "active-voice" and silence or background noise will be denoted as "non-active-voice".

The above argument leads to the concept of dual-mode speech coding schemes, which are usually also variable-rate coding schemes. The different modes of the input signal (active-voice or non-active-voice) are determined by a signal classifier, which can operate external to, or within, the speech encoder. A different coding scheme is employed for the non-active-voice signal, using less bits and resulting in an overall higher average compression ratio. The classifier output is binary, and is commonly called "voicing decision." The classifier is also commonly called Voice Activity Detector ("VAD").

The VAD algorithm operates on frames of digitized speech. The frame duration usually coincided with the frames of the speech coder. For each frame, the VAD is using a set of parameters, extracted from the input speech signal, to make the voicing decision. These parameters usually include energies and spectral parameters. A typical VAD operation is based on the comparison of such set of instantaneous parameters to a set of parameters which represents the background noise characteristics. Since the noise characteristics are unknown beforehand, they are usually modeled as a running average estimates of the energies and the spectral parameters during non-active voice frames.

A schematic representation of a speech communication system which employs a VAD for a higher compression rate is depicted in FIG. 1. The input to the speech encoder (110) is the digitized incoming speech signal (105). For each frame of digitized incoming speech signal the VAD (125) provides the voicing decision (140), which is used as a switch (145) between the active-voice encoder (120) and the non-active-voice encoder (115). Either the active-voice bit-stream (135) or the non-active-voice bit-stream (130), together with the voicing decision (140) are transmitted through the communication channel (150). At the speech decoder (155) the voicing decision is used in the switch (160) to select the non-active-voice decoder (165) or the active-voice decoder (170). For each frame, the output of either decoders is used as the reconstructed speech (175).

SUMMARY OF THE PRESENT INVENTION

A method is disclosed for generating frame voicing decisions for an incoming speech signal having periods of active voice and non-active voice for a speech encoder in a speech communication system. The method first extracts a predetermined set of parameters from the incoming speech signal for each frame and then makes a frame voicing decision of the incoming speech signal for each frame according to a set of difference measures extracted from the predetermined set of parameters. The predetermined set of extracted parameters comprises a description of the spectrum of the incoming speech signal based on line spectral frequencies ("LSF"). Additional parameters may include full band energy, low band energy and zero crossing rate. The way to make a frame voicing decision of the incoming speech signal for each frame according to the set of difference measures is by finding a union of sub-spaces with each sub-space being described by a linear function of at least a pair of parameters from the predetermined set of parameters.

BRIEF DESCRIPTION OF THE DRAWINGS

Additional features, objects and advantages of the present invention will become apparent to those skilled in the art from the following description, wherein:

FIG. 2 is a process flowchart of the VAD in accordance with the present invention.

Figure 1:
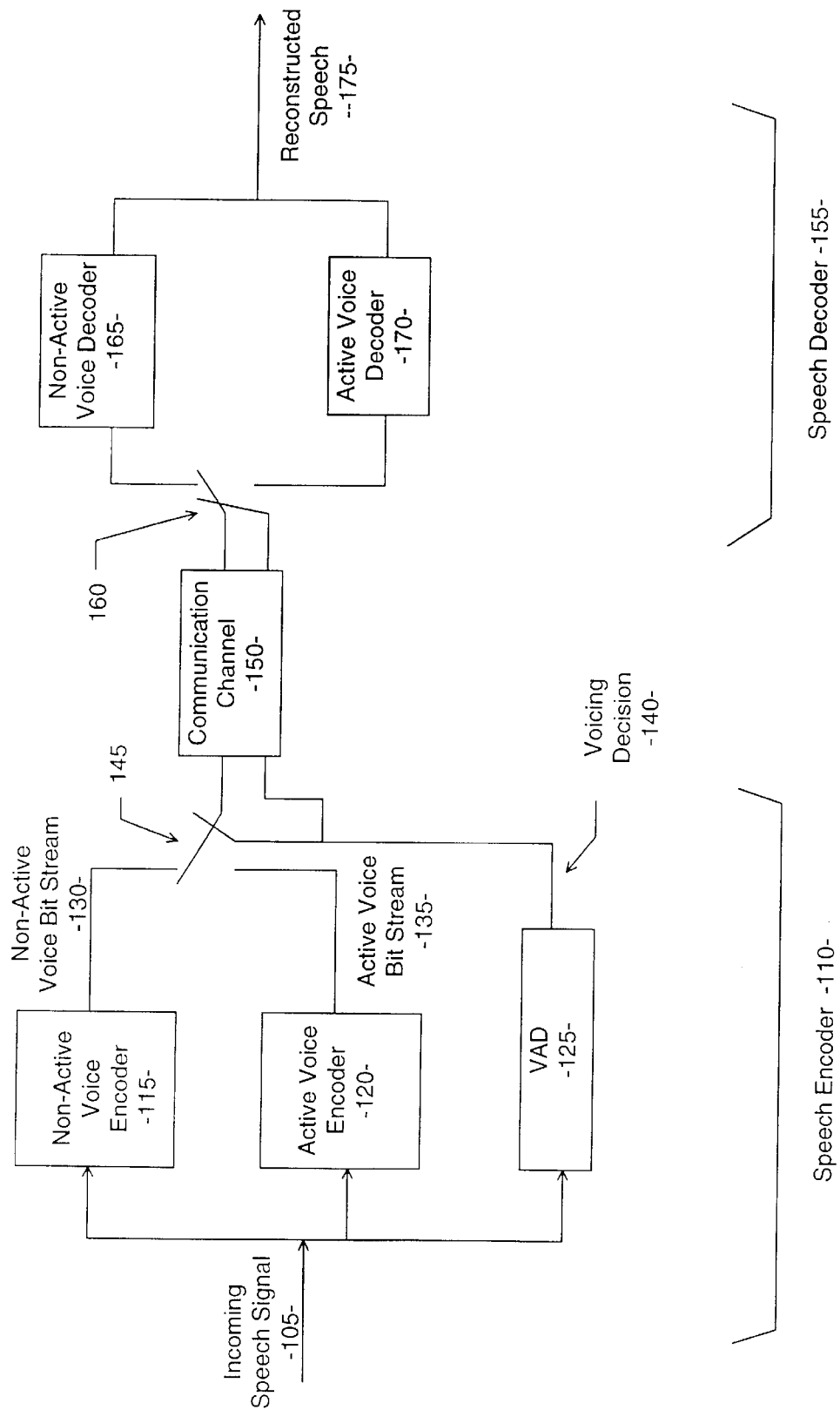
FIG. 1 is a schematic representation of a speech communication system using a VAD.

DETAILED DESCRIPTION OF THE
PREFERRED EMBODIMENT

A voice activity detection method and apparatus for a speech communication system is disclosed. In the following description, the present invention is described in terms of functional block diagrams and process flow charts, which are the ordinary means for those skilled in the art of speech coding to communicate among themselves. The present invention is not limited to any specific programming languages, since those skilled in the art can readily determine the most suitable way of implementing the teaching of the present invention.

A. General

In the preferred embodiment, a Voice Activity Detection (VAD) module is used to generate a voicing decision which switches between an active-voice encoder/decoder and a non-active-voice encoder/decoder. The binary voicing decision is either 1 (TRUE) for the active-voice or 0 (FALSE) for the non-active-voice.

The VAD flowchart of operation is given in FIG. 2. The VAD operates on frames of digitized speech. The frames are processed in time order and are consecutively numbered from the beginning of each conversation/recording.

At the first block (200), four parametric features are extracted from the input signal. Extraction of the parameters can be shared with the active-voice encoder module (120) and the non-active-voice encoder module (115) for computational efficiency. The parameters are the frame full band energy, the frame low-band energy, a set of spectral parameters called Line Spectral Frequencies ("LSF") and the frame zero crossing rate.

If the frame number is less than $N_i$, an initialization block (205) for the average frame energy takes place, and the voicing decision is forced to 1.

If the frame number is equal to $N_i$, the average frame energy is updated at block (215) and an initialization block (220) for the running averages of the background noise characteristics takes place.

If the frame number is larger than $N_i$, the average frame energy update block (215) takes place.

At the next block (230) a set of difference parameters is calculated. This set is generated as difference measures between the current frame parameters and the running averages of the background noise characteristics. Four difference measures are calculated:

a spectral distortion
an energy difference
a low-band energy difference
a zero-crossing difference The initial voicing decision is made at the next block (235), using multi-boundary decision regions in the space of the four difference measures. The active-voice decision is given as the union of the decision regions and the non-active-voice decision is its complementary logical decision.

The initial decision does not take into account neighboring past frames, which can help in decision smoothing, considering the stationarity of the speech signal. Energy consideration, together with neighboring past frames decisions, are used in block (240) for decision smoothing.

The difference parameters were generated at block (230) as a difference between the current frame parameters and the running averages of the background noise characteristics. These running averages are updated in block (250). Since the running averages are updated only in the presence of background noise, and not in the presence of speech, few energy thresholds are tested at block (245), and an update takes place only if the thresholds are met.

B. Parameters Extraction

For each frame a set of parameters is extracted from the speech signal. The parameters extraction module can be shared between the VAD (125), the active-voice encoder (120) and the non-active-voice encoder (115). The primary set of parameters is the set of autocorrelation coefficients, which is derived according to ITU-T, Study Group 15 Contribution—Q. 12/15, Draft Recommendation G.729, Jun. 8, 1995, Version 5.0, or DIGITAL SPEECH—Coding for Low Bit Rate Communication Systems by A.M. Kondoz, John Wiley & Son, 1994, England. The set of autocorrelation coefficients will be denoted by $\{R(i)\}_{i=0}^{q}$.

1) Line Spectral Frequencies (LSF)

A set of linear prediction coefficients is derived from the autocorrelation and a set of $\{\overline{LSF}_i\}_{i=1}^{P}$ is derived from the set of linear prediction coefficients, as described in ITU-T, Study Group 15 Contribution—Q. 12/15, Draft Recommendation G.729, Jun. 8, 1995, Version 5.0, or DIGITAL SPEECH—Coding for Low Bit Rate Communication Systems by A.M. Kondoz, John Wiley & Son, 1994, England.

2) Full Band Energy

The full band energy $E_f$ is the logarithm of the normalized first autocorrelation coefficient R(0):

$$E_f = 10 \cdot \log_{10}[1/NR(0)],$$

where N is a predetermined normalization factor.

3) Low Band Energy

The low band energy $E_1$ measured on 0 to $F_l$ Hz band, is computed as follows:

$$E_1 = 10 \cdot \log_{10}[1/Nh^tRh],$$

where h is the impulse response of an FIR filter with cutoff frequency at $F_l$ Hz, R is the Toeplitz autocorrelation matrix with the autocorrelation coefficients on each diagonal, and N is a predetermined normalization factor.

4) Zero Crossing Rate

Normalized zero-crossing rate ZC for each frame is calculated by:

$$ZC = \frac{1}{M} \sum_{i=0}^{M-1} [sgn[x(i)] - sgn[x(i-1)]],$$

where $\{x(i)\}$ is the pre-processed input speech signal and M is a predetermined number.

C. Average Energy Initialization And Update

The running average for the frame energy is denoted by $\overline{E}$. The initial value for $\overline{E}$, calculated at block (205), is:

$$\overline{E} = \frac{1}{N_i} \sum_{n=1}^{N_i} E_f.$$

This running average is updated for each frame after the $N_i$ frame, at block (215), using:

$$\overline{E} = \alpha_1 \cdot \overline{E} + (1-\alpha_1) \cdot E_f.$$

D. Initialization Of The Running Averages Of The Background Noise Characteristics The spectral parameters of the background noise, denoted by $\{\overline{LSF}_i\}_{i=1}^{P}$ are initialized to the constant values $\{\overline{LSF}_i^0\}_{i=1}^{P}$. The average of the background noise zero-crossings, denoted by $\overline{ZC}$ is initialized to the constant value $\overline{ZC}_0$.

At block (220), if the frame number is equal to $N_i$, the running averages of the background noise full band energy, denoted by $\overline{E}_f$, and the background noise low-band energy, denoted by $\overline{E}_l$, are initialized. The initialization procedure uses the initial value of the running average of the frame energy-$\overline{E}$, which can also be modified by this initialization.

The initialization procedure is illustrated as follows:

if $\overline{E} \leq T_1$ then $\overline{E}_f = \overline{E} + K_0$ $\overline{E}_l = \overline{E} + K_1$ $\overline{E} = \overline{E} + K_2$ -continued else if $T_1 < \bar{E} < T_2$ then $\bar{E}_f = \bar{E} + K_3$ $\bar{E}_l = \bar{E} + K_4$ $\bar{E} = \bar{E} + K_5$ else $\bar{E}_f = \bar{E} + K_6$ $\bar{E}_l = \bar{E} + K_7$ $\bar{E} = \bar{E} + K_8$ E. Generating The Difference Parameters Four difference measures are generated from the current frame parameters and the running averages of the background noise at block (230).

1) The Spectral Distortion $\Delta S$

The spectral distortion measure is generated as the sum of squares of the difference between the current frame $\{LSF_i\}_{i=1}^P$ vector and the running averages of the background noise $\{\overline{LSF}_i\}_{i=1}^P$:

$$\Delta S = \sum_{i=1}^{p} (LSF_i - \overline{LSF}_i)^2.$$

2) The Full-Band Energy Difference $\Delta E_f$

The full-band energy difference measure is generated as the difference between the current frame energy, $E_f$, and the running average of the background noise energy, $\bar{E}_f$:

$\Delta E_f = \bar{E}_f - E_f$

3) The Low-Band Energy Difference $\Delta E_l$

The low-band energy difference measure is generated as the difference between the current frame low-band energy, $E_l$, and the running average of the background noise energy, $\bar{E}_l$:

$\Delta E_l = \bar{E}_l - E_l$

4) The Zero-Crossing Difference $\Delta ZC$

The zero-crossing difference measure is generated as the difference between the current frame zero-crossing rate, ZC, and the running average of the background noise zero-crossing rate, $\overline{ZC}$:

$\Delta ZC = \overline{ZC} - ZC.$

F. Multi-Boundary Initial Voicing Decision

The four difference parameters lie in the four dimensional Euclidean space. Each possible vector of difference parameters defines a point in that space. A predetermined decision region of the four dimensional Euclidean space, bounded by three dimensional hyper-planes, is defined as non-active-voice region, and its complementary is defined as active-voice region. Each of the three dimensional hyper-planes is defining a section of the boundary of that decision region. Moreover, for the simplicity of the design, each hyper-plane is perpendicular to some two axes of the four dimensional Euclidean space.

The initial voicing decision, obtained in block (235), is denoted by $I_{VD}$. For each frame, if the vector of the four difference parameters lies within the non-active-voice region, the initial voicing decision is 0 ("FALSE"). If the vector of the four difference parameters lies within the active-voice region, the initial voicing decision is 1 ("TRUE"). The 14 boundary decisions in the four-dimensional space are defined as follows:

1) if $\Delta S > a_1 \cdot \Delta ZC + b_1$ then $I_{VD} = 1$
2) if $\Delta S > a_2 \cdot \Delta ZC + b_2$ then $I_{VD} = 1$
3) if $\Delta S > a_3$ then $I_{VD} = 1$
4) if $\Delta E_f < a_4 \cdot \Delta ZC + b_4$ then $I_{VD} = 1$
5) if $\Delta E_f < a_5 \cdot \Delta ZC + b_5$ then $I_{VD} = 1$
6) if $\Delta E_f < a_6$ then $I_{VD} = 1$
7) if $\Delta E_f < a_7 \cdot \Delta S + b_7$ then $I_{VD} = 1$
8) if $\Delta S > b_8$ then $I_{VD} = 1$
9) if $\Delta E_l < a_9 \cdot \Delta ZC + b_9$ then $I_{VD} = 1$
10) if $\Delta E_l < a_{10} \cdot \Delta ZC + b_{10}$ then $I_{VD} = 1$
11) if $\Delta E_l < b_{11}$ then $I_{VD} = 1$
12) if $\Delta E_l < a_{12} \cdot \Delta S + b_{12}$ then $I_{VD} = 1$
13) if $\Delta E_l > a_{13} \cdot \Delta E_f + b_{13}$ then $I_{VD} = 1$
14) if $\Delta E_l < a_{14} \cdot \Delta E_f + b_{14}$ then $I_{VD} = 1$ Geometrically, for each frame, the active-voice region is defined as the union of all active-voice sub-spaces, and the non-active-voice region is its complementary region of intersection of all non-active-voice sub-spaces.

G. Voicing Decision Smoothing

The initial voicing decision is smoothed to reflect the long term stationary nature of the speech signal. The smoothing is done in three stages. The smoothed voicing decision of the frame, the previous frame and frame before the previous frame are denoted by $S_{VD}^{0}$, $S_{VD}^{-1}$ and $S_{VD}^{-2}$, respectively. $S_{VD}^{-1}$ is initialized to 1, and $S_{VD}^{-2}$ is initialized to 1.

For start $S_{VD}^{0} = I_{VD}$. The first smoothing stage is:

if $I_{VD} = 0$ and $S_{VD}^{-1} = 1$ and $E < \bar{E}_f + T_3$ then $S_{VD}^{0} = 1$.

For the second smoothing stage define one Boolean parameter $F_{VD}^{-1}$. $F_{VD}^{-1}$ is initialized to 1. Also define a counter denoted by $C_e$, which is initialized to 0. Denote the energy of the previous frame by $E_{-1}$. The second smoothing stage is:

if $F_{VD}^{-1} = 1$ and $I_{VD} = 0$ and $S_{VD}^{-1} = 1$ and $S_{VD}^{-2} = 1$ and $|E - E_{-1}| \leq T_4$ {

$S_{VD}^{O} = 1$ $C_e = C_e + 1$ if $C_e \leq T_4^{**}$ {

$F_{VD}^{-1} = 1$

} else {

$F_{VD}^{-1} = 0$ $C_e = 0$

}

} else $F_{VD}^{-1} = 1$

For the third smoothing stage define the counter $C_s$ which is initialized to 0. Also define the Boolean parameter $F_{VD}^{*}$ which is initialized to 0.

The third smoothing stage is:

if $S_{VD}^{0} = 0$ $C_s = C_s + 1$ if $S_{VD}^{0} = 1$ and $C_s > L_1$ and $E - \bar{E} \leq T_4^{*}$ $S_{VD}^{0} = 0$ $C_s = 0$ $F_{VD}^* = 1$
if $C_s > L_2$ and $F_{VD}^* = 1$
$F_{VD}^* = 0$
if $S_{VD}^0 = 1$
$C_S = 0$ H. Updating The Running Averages Of The Background Noise Characteristics The running averages of the background noise characteristics are updated at the last stage of the VAD algorithm. At block (245) the following conditions are tested and the updating takes place only if these conditions are met:

if $[E < \frac{1}{2} \cdot (\overline{E} - \overline{E}_f) - T_5]$ and $(\overline{E} < T_6)$ then update.

If the conditions for update are met, the running averages of the background noise characteristics are updated using first order AR update. A different AR coefficient is used for each parameter. Let $\beta_{E_f}$ be the AR coefficient for the update of $\overline{E}_f$, $\beta_{E_l}$ be the AR coefficient for the update of $\overline{E}_l$, $\beta_{ZC}$ be the AR coefficient for the update of $\overline{ZC}$ and $\beta_{LSF}$ be the AR coefficient for the update of $\{\overline{LSF}_i\}_{i=1}^P$. The number of frames which were classified as non-active-voice is counted by $C_n$. The coefficients $\beta_{E_f}, \beta_{E_l}, \beta_{ZC}$, and $\beta_{LSF}$ depend on the value of $C_n$. The AR update is done at block (250) according to:

$\overline{E}_f = \beta_{E_f} \cdot \overline{E}_f + (1 - \beta_{E_f}) \cdot E_f$ $\overline{E}_l = \beta_{E_l} \cdot \overline{E}_l + (1 - \beta_{E_l}) \cdot E_l$ $\overline{ZC} = \beta_{ZC} \cdot \overline{ZC} + (1 - \beta_{ZC}) \cdot ZC$ $\overline{LSF}_i = \beta_{LSF} \cdot \overline{LSF}_i + (1 - \beta_{LSF}) \cdot LSF_i, i = 1, \ldots, p$ At the final stage $\overline{E}_f$ is updated according to:

if $L_3 < C_n$ and $\overline{E} < \overline{E}_f + T_7$ then $\overline{E} = \overline{E}_f + T_8$.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. In a speech communication system comprising: (a) a speech encoder for receiving and encoding an incoming speech signal to generate a bit stream for transmission to a speech decoder; (b) a communication channel for transmission; and (c) a speech decoder for receiving the bit stream from the speech encoder to decode the bit stream to generate a reconstructed speech signal, said incoming speech signal comprising periods of active voice and non-active voice, a method for generating frame voicing decisions, comprising the steps of:

a) extracting a predetermined set of parameters from said incoming speech signal for each frame;

b) making a frame voicing decision of the incoming speech signal for each frame according to said predetermined set of parameters, wherein said predetermined set of parameters in said Step a) comprises a a spectral difference between said incoming speech signal and ambient background noise based on LSF.

2. In a speech communication system comprising: (a) a speech encoder for receiving and encoding an incoming speech signal to generate a bit stream for transmission to a speech decoder; (b) a communication channel for transmission; and (c) a speech decoder for receiving the bit stream from the speech encoder to decode the bit stream to generate a reconstructed speech signal, said incoming speech signal comprising periods of active voice and non-active voice, a method for generating frame voicing decisions, comprising the steps of:

a) extracting a predetermined set of parameters from said incoming speech signal for each frame;

b) making a frame voicing decision of the incoming speech signal for each frame according to said predetermined set of parameters, wherein said predetermined set of parameters in said Step a) comprises a difference between the zero-crossing rate of said incoming speech signal and the zero-crossing rate of ambient background noise.

3. A method according to claim 2, wherein said predetermined set of parameters further comprises a description of a spectral difference between said incoming speech signal and ambient background noise based on LSF.

4. A method according to claim 3, wherein said predetermined set of parameters further comprises differences in full band energy and low band energy.

5. A method according to claim 4, said Step b) of making the frame voicing decision being based on a selective combination of difference measures of at least 2 of the following parameters:

i) LSF;
ii) zero-crossing rate;
iii) full band energy;
iv) low band energy, where at least 1 of the selected parameters is either LSF or zero-crossing rate.

6. A method according to claim 5, further comprising a step of:

keeping running averages of difference measures of said at least 2 parameters in said selective combination according to a set of predetermined thresholds.

7. A method according to claim 6, wherein said Step b) makes a frame voicing decision of the incoming speech signal for each frame according to said set of difference measures, based on a union of sub-spaces with each sub-space being described by a linear function of at least a pair of difference measures from said set of difference measures.

8. In a speech communication system comprising: (a) a speech encoder for receiving and encoding an incoming speech signal to generate a bit stream for transmission to a speech decoder; (b) a communication channel for transmission; and (c) a speech decoder for receiving the bit stream from the speech encoder to decode the bit stream to generate a reconstructed speech signal, said incoming speech signal comprising periods of active voice and non-active voice, a method for generating frame voicing decisions, comprising the steps of:

a) extracting a predetermined set of parameters from said incoming speech signal for each frame;

b) making a frame voicing decision of the incoming speech signal for each frame according to said predetermined set of parameters, based on a union of sub-spaces with each sub-space being described by a linear function of at least a pair of parameters from said predetermined set of parameters.

9. In a speech communication system comprising: (a) a speech encoder for receiving and encoding an incoming speech signal to generate a bit stream for transmission to a speech decoder; (b) a communication channel for transmission; and (c) a speech decoder for receiving the bit stream from the speech encoder to decode the bit stream to generate a reconstructed speech signal, said incoming speech signal comprising periods of active voice and non-active voice, an apparatus coupled to said speech encoder for generating frame voicing decisions, comprising:

a) extraction means for extracting a predetermined set of parameters from said incoming speech signal for each frame, wherein said predetermined set of parameters comprises a spectral difference between said incoming speech signal and ambient background noise based on LSF; and b) VAD means for making a voicing decision of the incoming speech signal for each frame according to said predetermined set of parameters, such that a bit stream for a period of either active voice or non-active voice is generated by said speech encoder.

10. An apparatus according to claim 9, wherein said predetermined set of parameters further comprises a description of the incoming speech signal based on a difference between the zero-crossing rate of said incoming speech signal and the zero-crossing rate of ambient background noise.

11. An apparatus according to claim 10, wherein said predetermined set of parameters further comprises differences in full band energy and low band energy.

12. An apparatus according to claim 11, wherein said VAD means makes the frame voicing decision being based on a selective combination of difference measures of at least 2 of the following parameters:

i) LSF;

ii) zero-crossing rate;

iii) full band energy;

iv) low band energy, where at least 1 of the selected parameters is either LSF or zero-crossing rate.

13. An apparatus according to claim 12, further comprising:

average means coupled to said extraction means for keeping a plurality of running averages of said at least 2 parameters in said selective combination according to a set of predetermined thresholds.

14. An apparatus according to claim 13, wherein said VAD means makes a frame voicing decision of the incoming speech signal for each frame according to said set of difference measures using a union of sub-spaces with each sub-space being described as linear functions of at least a pair of difference measures from said set of difference measures.

* * * * *